United States Patent [19]

Shinkai

[11] Patent Number: 4,635,106
[45] Date of Patent: Jan. 6, 1987

[54] BEAM INDEX COLOR CATHODE RAY TUBE WITH COLOR-IDENTIFYING PATTERNS OF STRIPES DISPOSED IN BEAM RUN-IN AREA OF DISPLAY SURFACE

[75] Inventor: Kinya Shinkai, Yokohama, Japan

[73] Assignee: Sony Corporation, Tokyo, Japan

[21] Appl. No.: 610,302

[22] PCT Filed: Sep. 12, 1983

[86] PCT No.: PCT/JP83/00304
§ 371 Date: May 4, 1984
§ 102(e) Date: May 4, 1984

[87] PCT Pub. No.: WO84/01255
PCT Pub. Date: Mar. 29, 1984

[30] Foreign Application Priority Data

Sep. 13, 1982 [JP] Japan ................ 57-159353

[51] Int. Cl.⁴ .......... H04N 9/24; H01J 29/10; H01J 29/74; H01J 29/56
[52] U.S. Cl. .................... 358/68; 358/67; 313/471; 315/369; 315/370
[58] Field of Search ............ 358/67, 68, 69, 66, 358/70; 313/461, 471; 315/369, 370, 371

[56] References Cited

U.S. PATENT DOCUMENTS

| | | | |
|---|---|---|---|
| 2,684,454 | 7/1954 | Huffman | 315/369 |
| 2,728,026 | 12/1955 | Van Overbeek | 313/471 |
| 2,757,313 | 7/1956 | Miller | 315/369 |
| 2,762,949 | 9/1956 | Huffman | 315/369 |
| 2,934,600 | 4/1960 | Schwartz et al. | 358/68 |
| 3,784,735 | 1/1974 | Brown et al. | 358/68 |
| 3,800,072 | 3/1974 | Lejon | 358/68 |
| 4,259,687 | 3/1981 | Shinkai et al. | 358/69 |
| 4,369,460 | 1/1983 | Weiss | 358/68 |

FOREIGN PATENT DOCUMENTS 2057187  3/1981  United Kingdom ........ 313/471

Primary Examiner—James J. Groody
Assistant Examiner—Randall S. Svihla
Attorney, Agent, or Firm—Lewis H. Eslinger; Alvin Sinderbrand

[57] ABSTRACT

A television receiver in which a plurality of picture-displaying fluorescent lines (3), which are disposed on a screen (2) as the display surface of a cathode ray-tube so as to extend in the horizontal direction (in the direction of the arrow X) as the beam main-scanning direction, and in the vertical direction (in the direction of the arrow Y) as the beam sub-scanning direction, and a single electron beam is arranged to scan across the screen (2) to display a picture. The television receiver has two kinds of beam detection stripes (5A), (5B) disposed in each respective guard band portion between adjacent fluorescent lines (3) so as to be parallel to the fluorescent lines (3). On the basis of beam detection signals independently taken from the beam detection stripes (5A), (5B) in correspondence to beam spots (S) of the electron beam on the screen (2), the vertical positions (in the direction of the arrow Y) of the electron beam spots (S) with respect to the fluorescent lines (3) are controlled. For the beam detection stripes, it is possible to employ index fluorescent stripes employing two kinds of fluorescent substances or a pair of comb electrodes.

8 Claims, 6 Drawing Figures

BEAM INDEX COLOR CATHODE RAY TUBE WITH COLOR-IDENTIFYING PATTERNS OF STRIPES DISPOSED IN BEAM RUN-IN AREA OF DISPLAY SURFACE

TECHNICAL FIELD

This invention relates to a television receiver in which a picture or image is displayed on a raster or displaying surface of a cathode ray tube by having said surface scanned with a single electron beam. More particularly, it relates to such television receiver in which color fluorescent materials are provided so as to extend in a beam main-scanning direction and a color picture or image is displayed on the raster surface with the aid of line-sequential video signals.

PRIOR ART

In a color television receiver, in general, a screen coated with color phosphorescent materials (phosphors) capable of emitting three primary colors, that is, red, green and blue colors, when activated, is scanned with a single electron beam or three electron beams for displaying a color image or picture on the screen. So far, there has been evolved a variety of color television receiver systems.

For example, there has been provided a color television system making use of a beam-indexing tube in which plural stripes of color phosphorescent materials are arranged side by side in the main-scanning (or horizontal) direction on a screen of a cathode ray tube (CRT) so as to extend in the sub-scanning (usually, vertical) direction, index lines are arranged between said stripes for providing index signals indicative of the beam scanning position, the color phosphorescent materials are scanned dot- or point-sequentially with a single electron beam, and in which the electron beam is switched between different colors based on said index signals. With this version of the color television receiver, the electron beam is driven by pulses for color switching with a higher frequency of several hundred times in each horizontal period. This results in useless obstructive radiation and an extremely complicated circuit design.

Another type of the color television receiver known in the art is so constructed that the screen has plural lines of color phosphorescent materials that extend parallel to the main-scanning (usually horizontal) direction, the phosphorescent materials are scanned line-sequentially with a single electron beam, and the beam is switched between different colors with the period of the horizontal sync signal (1H period). However, with this line-sequential type system, correct landing of the electron beam on the respective color phosphorescent lines and interlacing between odd-line and even-line fields are required, thus unnecessarily complicating the screen construction and the circuit design.

In consideration of the prior-art practice, described briefly above, it is a principal object of the present invention to provide a television receiver in which fluorescent lines are arranged so as to extend parallel to the main-scanning (usually, horizontal) direction, wherein beam landing on the respective color phosphorescent lines and interlacing between odd and even fields may be assured by a simplified structure.

DISCLOSURE OF THE INVENTION

The feature of the television receiver of the present invention resides in that a plurality of imagedisplaying fluorescent lines are disposed on a display surface of a cathode ray tube so as to.extend along a main-scanning direction of an electron beam, said lines are disposed in a side-by-side relation in a sub-scanning direction normal to said main-scanning direction, two kinds of beam detection stripes are arranged on guard band portions that are disposed parallel to and between adjacent ones of said fluorescent lines, said beam detection stripes are so adapted that beam detection signals are taken sequentially, alternately and independently from said stripes, and the relative beam position with respect to the fluorescent lines is compensated on the basis of said beam detection signals taken independently from these two kinds of beam detection stripes.

In this manner, positive landing control of the electron beam relative to the respective fluorescent lines and interlaced scanning between odd and even fields may be realized by a simplified circuit configuration.

BRIEF DESCRIPTION OF THE DRAWINGS

FIG. 1 is a plan view showing substantial parts of the inner surface of the CRT screen.

FIG. 2 is a sectional view taken along line II—II of FIG. 1.

FIG. 3 is a block circuit diagram showing a circuit design for said embodiment.

FIG. 4 is a timing chart for illustrating the operation of the circuit shown in FIG. 3.

FIG. 5 is a plan view showing substantial parts of the screen for illustrating the control operation of beam position compensation.

BEST MODE OF PRACTICING THE INVENTION

A preferred embodiment of the present invention as applied to a color television receiver is hereafter described by referring to the accompanying drawings.

Figure 2:
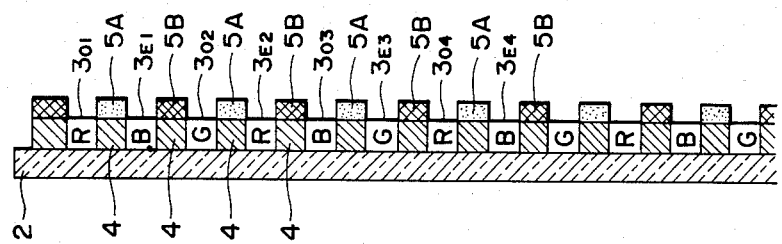
FIGS. 1 through 5 illustrate an embodiment of the color television receiver pertaining to the present invention.
Figure 1:
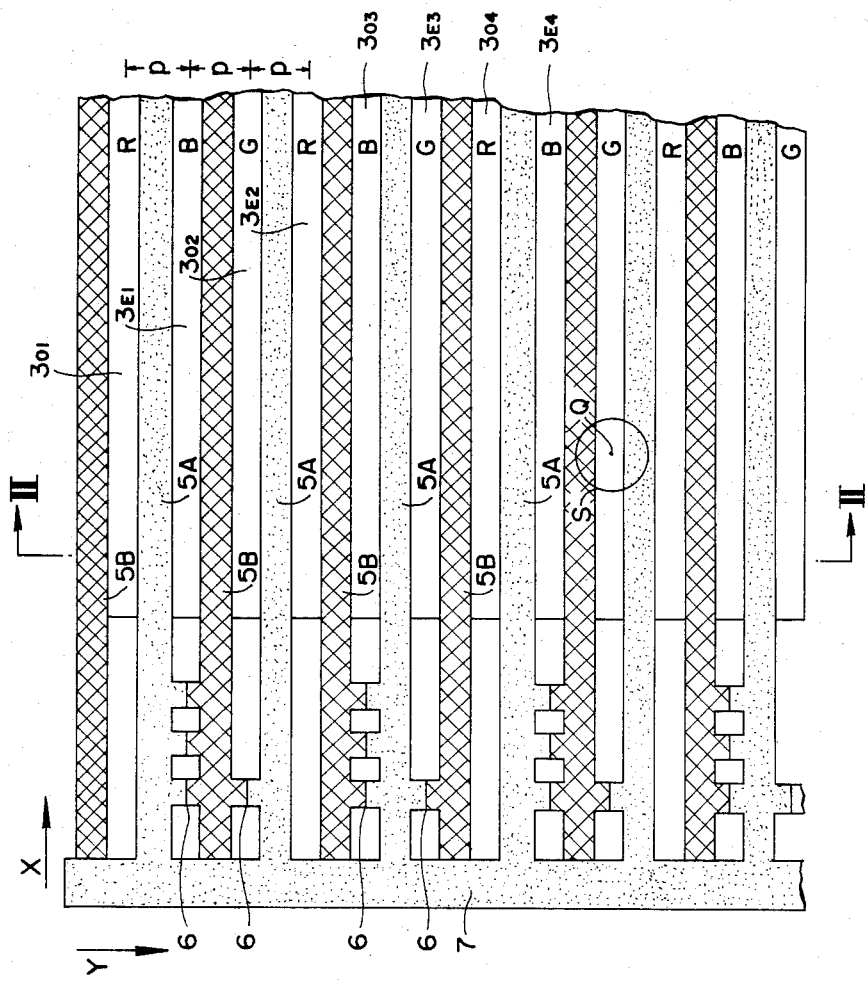
Figure 3:
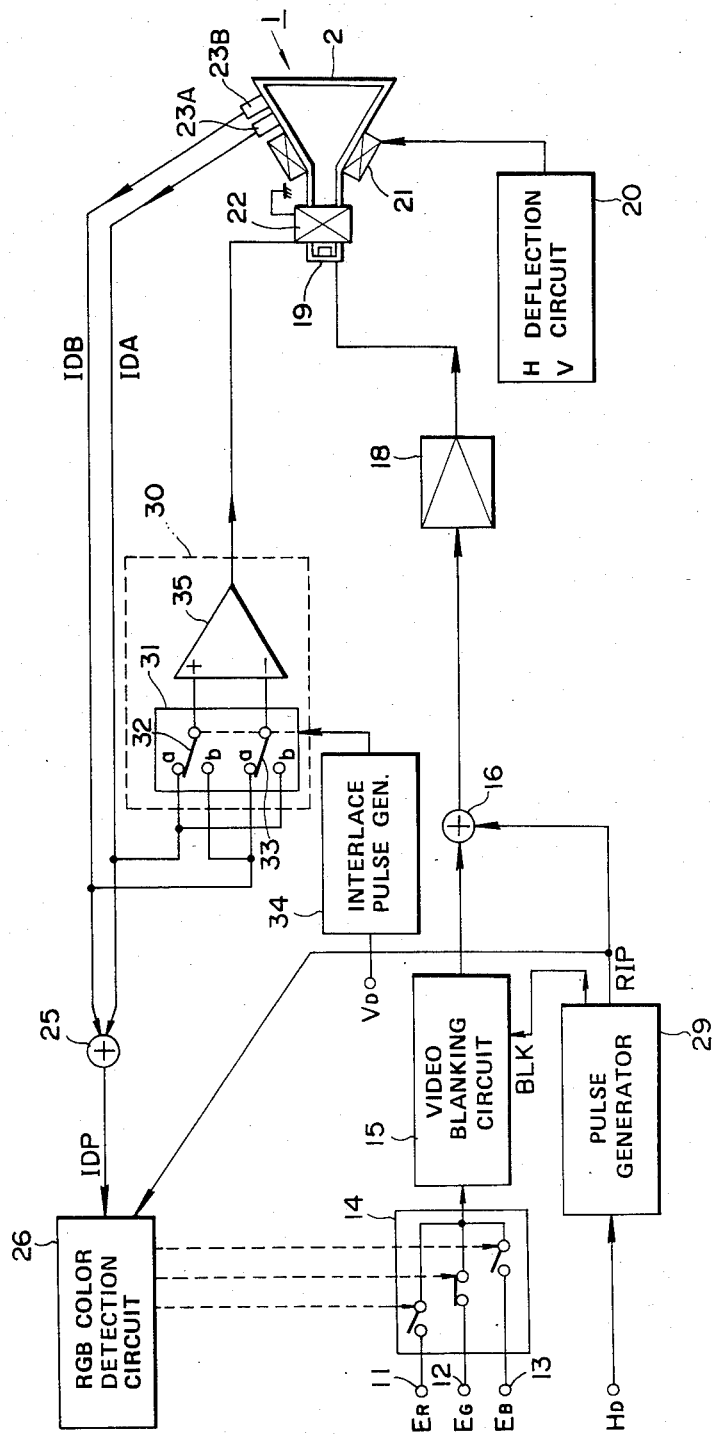

FIG. 1 is a plan view showing a portion of an inner phosphorescent display surface of a cathode ray tube (CRT) employed in a color television receiver embodying the present invention. FIG. 2 is a sectional view taken along line II—II of FIG. 1. FIG. 3 is a block circuit diagram of the color television receiver embodying the present invention.

Referring to these FIGS. 1 to 3, a number of phosphorescent stripes or lines 3 are provided on the inner display surface or screen 2 of CRT 1 so as to extend in the horizontal direction (shown by an arrow mark X) which is the beam main-scanning direction. These phosphorescent lines 3 consist of odd-field and even-field lines alternately arranged at a constant pitch p along the vertical or sub-scanning direction (shown by the arrow mark Y) at right angles with the mainscanning direction. Non-fluorescent guard bands 4 coated with black paint such as carbon are disposed between adjacent phosphorescent lines 3. These guard bands are alternately coated with index phosphorescent materials for providing index lines or stripes 5A, 5B acting as two kinds of beam detection means. The phosphorescent materials (phosphors) of these index stripes 5A, 5B are different from each other as to color temperatures or the wavelength of the light or electromagnetic waves emitted upon irradiation with an electron beam. Thus, by separately sensing the emitted light by light sensors or the like, it is possible to separately take out beam-detection index signals. An index line 5A is disposed adjacent to one side such as lower side (in FIG. 1) of one odd-field phosphorescent line 3, and an index line 5B is disposed adjacent to one side such as lower side of one even-field fluorescent line 3. In addition, the fluorescent lines 3 of a given field are arraged vertically in a repeated cyclic pattern of red (R), green (G) and blue (B) colors or red (R), blue (B) and green (G), and the fluorescent lines of the odd and even fields taken as a whole are also arranged vertically in a repeated cyclic pattern of R-B-G or R-G-B. In the example shown in FIG. 1, the odd-field lines $3_{01}, 3_{02}, 3_{03}, 3_{04} \ldots$ emit the light with R, G, B, R..., and the even-field lines $3_{E1}, 3_{E2}, 3_{E3}, 3_{E4} \ldots$ emit the light with colors B, R, G, B ... in such a fashion that the totality of the fluorescent lines $3_{01}, 3_{E1}, 3_{02}, 3_{E2}, 3_{03}, 3_{E3} \ldots$ emit the light with R, B, G, R, B, G ... in this order.

In the present embodiment, index phosphorescent stripes 6 are formed at the starting side of the phosphorescent lines 3 (at the left side in FIG. 1) as color discrimination or color detection marker or as hue identifying means. It is seen from FIG. 1 that each of these phosphorescent stripes 6 is coated with a corresponding index phosphorescent material depending upon the particular index stripe that it precedes. The number of these index phosphorescent stripes 6 is different with different colors in such a manner that zero, one and three index phosphorescent stripes 6 are provided for the red (R), green (G) and blue (B) color positions. A band-like index phosphorescent stripe or line 7 is formed at the starting side (extreme left side in FIG. 1) on the screen 2 in the vertical or the beam sub-scanning direction. Supposing that a pulse generated upon sensing the index phosphorescent line 7 and a pulse generated upon sensing the index phosphorescent stripe 6 are treated equally in the processing circuit, one, two and four color detection index pulse outputs are obtained respectively at the R, G and B phosphorescent lines. It should be noted that such color detection or discrimination is effected in the image blanking region, it being sufficient that color phosphorescent lines be formed at back of index phosphorescent stripes 6 or towards right thereof in FIG. 1.

Referring to a circuit shown in FIG. 3, red, greeen and blue television color signals $E_R$, $E_G$, $E_B$ are supplied, as from a color demodulation circuit, to three signal input terminals 11, 12, 13. These color signals $E_R$, $E_G$ and $E_B$ are supplied to a switching circuit 14 where they are sequentially switched at an interval of one horizontal period (1H) and outputted as line sequential color video signals. These video signals are supplied from the switching circuit 14 through a video blanking circuit 15 to a summing point 16, an output of which is amplified by video amplifier 18 and supplied to a single-beam electron gun 19 of CRT 1. On this CRT 1, there is provided a deflecting coil 21 for deflecting the electron beam on the display surface or screen 2 of CRT 1 in the horizontal or main-scanning direction and in the vertical or sub-scanning direction. The deflecting coil 21 is driven by the deflecting output from a horizontal-vertical deflection output circuit 20. The CRT 1 is also provided with a vertical deflection compensating coil 22 for compensating small positioning error of the electron beam with respect to the beam sub-scanning direction (vertical direction). The light (or electro-magnetic wave) generated by the beam projection on the index phosphorescent lines 5A, 5B is detected by light sensors 23A, 23B and the resulting signals are supplied to an interlace switchover gang switch 31 of a beam position compensation control circuit 30 having two interlocked switch elements 32, 33. A beam-detection index signal IDA indicative of the volume of the irradiated electron beam on the index line 5A from light sensor 23A is sent to a switch terminal a of the switch element 32 and a switch terminal b of the switch element 33, while a beam-detection index signal IDB indicative of the amount of the irradiated electron beam 23B on the index lines 5B is sent to a switch terminal b of the switch element 32 and to a switch terminal a of the switch element 33. The operation of the interlocked switch elements 32, 33 of the interlace gang switch 31 is controlled by an interlace switching pulse whose state is reversed at each vertical period (1V period) from the interlace pulse generator 34. The output from the switch element 32 is supplied to a non-inverting input of a vertical deflection compensating amplifier 35, and the output from the switch element 33 is supplied to an inverting input terminal of the amplifier 35, while the output from the vertical deflection compensating amplifier 35 is supplied to the vertical deflection compensating coil 22.

The beam-detection index signals IDA, IDB from the light sensors 23A, 23B are summed at a summing point 25 and supplied to an RGB color detection circuit 26. The output color detection signals from the circuit 26 are used for controlling the switching operation between color changeover switches of the switching circuit 14.

The color television receiver so far shown and described operates as follows.

Figure 4:
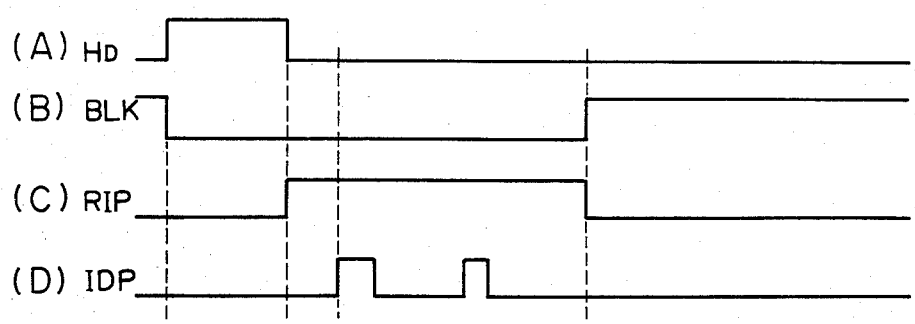

The pulse generator 29, adapted for generating various timing pulses for various circuit portions, is supplied with horizontal sync pulses $H_D$ shown at (A) in FIG. 4. A video blanking pulse BLK shown at (B) in FIG. 4 is derived from the horizontal sync pulse $H_D$ and supplied as gate control signals to the video blanking circuit 15. During the low level "L" period of the video blanking pulse BLK, the line sequential color video signal supplied to the video blanking circuit 15 is turned off. A run-in brightness pulse RIP is then outputted from the pulse generator 29, said brightness pulse being at a constant level following the low level of the horizontal sync pulse $H_D$ and continuing for as long as the video blanking pulse BLK is "L". This run-in brightness pulse RIP is supplied to the summing point 16 and to a control terminal of the color discriminating circuit 26. On the screen 2 of CRT 1, the run-in brightness pulse RIP is at a constant level during the time an electron beam is projected on the index phosphorescent line 7 and on the index phosphorescent stripes 6 (FIG. 1), while the beam index signals from the light sensors 23A, 23B are summed at the summing point 25 for producing index output pulses IDP for color discrimination as shown at (D) in FIG. 4. These index output pulses IDP are supplied to the color detection circuit 26. The circuit 26 is adapted for controlling the operation of the circuit 14 in such a manner that the colors associated with the phosphorescent lines 3 being scanned by the electron beam are discriminated depending on the number of input pulses supplied during the time the run-in brightness pulse RIP is at the above described constant level, such as R for one pulse, G for two pulses and B for four pulses.

The beam landing position control operation to be effected during the time the electron beam is scanning the color phosphor lines 3 in the main scanning (horizontal) direction is hereinafter described. When the electron beam lands on the color phosphorescent line 3 as indicated by a circular spot S shown in FIG. 1, small area portions defined by the spot S superimposed on the index phosphorescent stripes 5A, 5B neighboring to the phosphorescent line 3 are irradiated by the electron beam in such a manner that the beam-detection index signals with signal levels corresponding to the surface measures of these area portions are produced by the associated light sensors 23A, 23B. When the beam is deviated only slightly in the beam sub-scanning (vertical) direction, the signal level (magnitude) ratio of these beam index signals IDA, IDB is changed in dependence upon the extent of such beam deviation in the vertical direction. Hence, by slightly compensating for vertical deflection of the electron beam in such a manner that, for example, the signal level of the beam index signal IDA is equal to that of the beam index signal level IDB, beam landing control may be effected such that a center Q of the beam spot S is positioned at the center of the color phosphorescent line 3.

Figure 5:
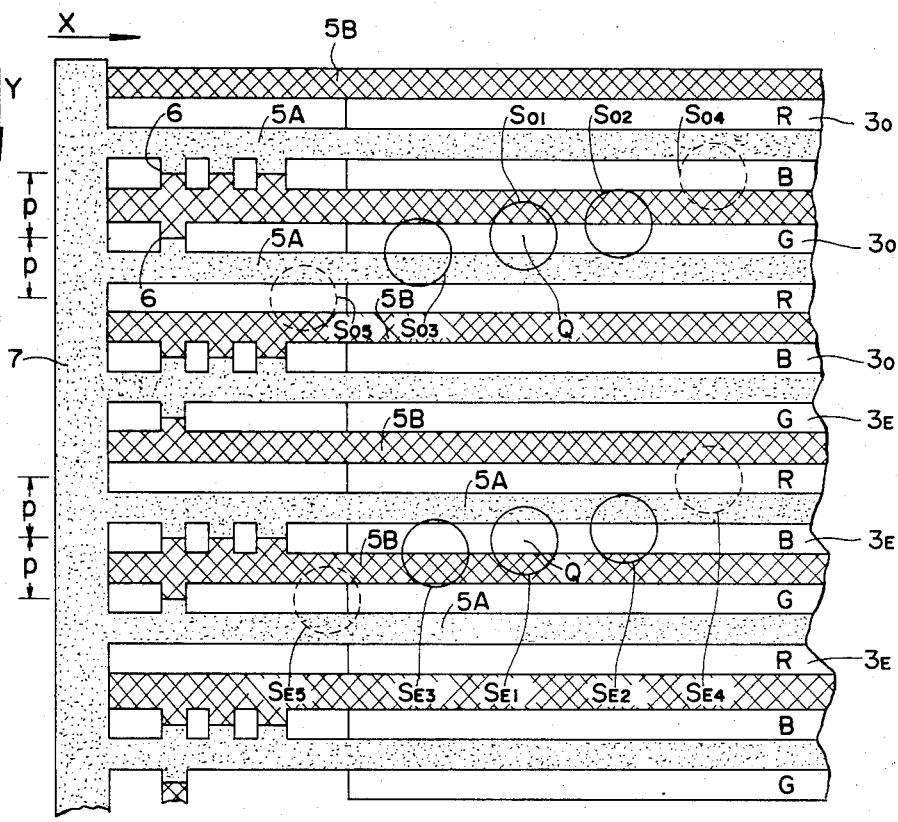

It should be noted that, as shown in FIGS. 1 or 5, the odd-field phosphorescent line $3_O$ is delimited at the lower side by one index line 5A and at the upper side by the other index line 5B. Thus, during odd-field scanning, the more the electron beam is deviated towards the upper side in the drawing, the more is the amount of the beam projected on the index line 5B and, the more the beam is deviated towards the lower side in the drawing, the more is the amount of the beam projected on the index line 5A, as indicated by beam spots $S_{O1}$, $S_{O2}$, $S_{O3}$ in FIG. 5.

Thus, as for beam index signals IDA, IDB outputted respectively by the light sensors 23A, 23B of the CRT 1 during odd-field scanning, IDA<IDB for the electron beam deviated towards above and IDA>IDB for the electron beam deviated towards below On the other hand, the even-field phosphorescent line $3_E$ is delimited at the upper side by the index line 5A and at the lower side by the index line 5B. Thus, during even-field scanning, the more the electron beam is deviated towards the upper side in the drawing, the more is the amount of the beam projected on the index line 5A, as indicated by beam spot $S_{E2}$. On the other hand, the more the beam is deviated towards the lower side in the drawing, the more is the amount of the beam projected on the index line 5A, as indicated by beam spot $S_{E3}$. Hence, as for beam index signals IDA, IDB for even-field scanning, IDA>IDB for the electron beam deviated towards above and IDA<IDB for the electron beam deviated towards below.

The beam-detection index signals IDA, IDB outputted respectively from the light sensors 23A, 23B of the CRT 1 are supplied to the beam position compensation control circuit shown in FIG. 3. The direction in which to compensate for vertical deflection of the electron beam is controlled by the circuit 30 in dependence upon the relative level of the index signals IDA, IDB.

Thus, during odd-field scanning, the switch elements 32, 33 of the interlace gang switch 31 of the control circuit 30 are moved to terminals a, so that the beam-detection index signal IDA is supplied through the switch element 32 to the non-inverting input terminal of the amplifier 35, while the signal IDB is supplied through the switch element 33 to the inverting terminal of the amplifier 35. The amplifier 35 is the differential input type operational amplifier and outputs to the vertical deflection compensating coil 22 a control signal equal to a level difference between the index signals multiplied by the gain (amplification factor). The vertical deflection compensating coil 22 is adapted for deflecting the electron beam vertically upward when the input is positive and deflecting the beam vertically downward when the input is negative. Thus, during odd-field scanning, when the electron beam spot is deviated towards below as indicated by $S_{O3}$ in FIG. 5, and the relative beam index signal level is indicated by IDA>IDB, the electron beam is deviated upward. When the beam spot is deviated towards above as indicated by $S_{O2}$ in FIG. 5 such that IDA<IDB, the beam is deflected downward in the drawing. The vertical beam position is compensated in this manner until finally the beam spot position $S_{O1}$ in FIG. 5 is reached at which the signal levels IDA, IDB are equal to each other.

During even-field scanning, the switch elements 32, 33 of the interlace gang switch 31 of the beam position compensating control circuit 30 are moved to terminals b, in such a manner that the direction in which to compensate for vertical deflection in relation to the level difference between the beam deflection signals IDA, IDB is reversed. Thus the control output from the vertical deflection compensating amplifier 35 is representative of the amplified signal difference (IDB−IDA). Therefore, when the beam spot is deflected towards above as indicated at $S_{E2}$ in FIG. 5, IDA>IDB so that the control output is negative and the compensating coil 22 deflects the beam towards below in FIG. 5. When the beam is deviated towards below as indicated at spot $S_{E3}$, IDA<IDB so that the control output is positive and the coil 22 deflects the beam towards above.

In the present embodiment, the non-inverting and the inverting inputs are alternately switched at the input side of the amplifier 35 between the odd-field and even-field beam-detection index signals. Alternatively, the input side of the amplifier 35 may be connected directly to signals IDA and IDB with no switching, and a signal transmission path with a gain equal to 1 and an inverting amplifier (inverter) with a gain equal to −1 may be alternately switched at the output side of the amplifier 35 between the odd-field and even-field beam-detection index signals.

In the amplifier 35, one of the beam index signals from the light sensors 23A, 23B is subtracted from the other for checking which of the signal levels of the beam-detection index signals is higher. Alternatively, one of the signals may be divided by the other for producing a signal ratio which is then used as basis for compensating vertical beam deflection. Still alternatively, the relative signal level may be derived by suitably combining subtraction and division for similarly compensating vertical beam deflection.

It should be noted that beam spots $S_{O4}$, $S_{O5}$, $S_{E4}$, $S_{E5}$ shown by dotted lines in FIG. 5 define the range in which the control operation can be performed for correctly positioning the beam spots in the desired manner. For example, when the electron beam is located within the vertical range delimited by $S_{O4}$ and $S_{O5}$, the beam is ultimately deflected to a vertical spot position $S_{01}$ by the aforementioned control operation.

The index phosphorescent stripes 6 provided at the upstream side relative to the horizontal scanning direction of the associated phosphorescent line 3 (left side in FIGS. 1 and 5) for color detection marking are coated with the aforementioned two kinds of index fluorescent materials with the line of demarcation lying on the horizontal center axis (not shown) of each color phosphorescent line 3 and with these fluorescent materials merging smoothly into the respective stripes 5A, 5B. Therefore, the signal level relation between the beam-detection index signals IDA, IDB remains the same at the start of horizontal scanning for scanning of index phosphorescent stripes as at the time of scanning the color phosphorescent lines, thus providing for correct compensation of vertical deflection.

According to the present embodiment, beam-detection index signals indicative of respective electron beam spot volumes can be taken out independently from the index fluorescent stripes 5A, 5B, thus simplifying the circuit structure. In addition, the electron beam can be maintained at a predetermined desired position relative to the odd-field and even-field color phosphorescent lines by the alternately arranged index phosphorescent stripes acting as two different kinds of beam detection means. With the use of a simple interlace changeover gang switch 31, it is also possible to effect landing control of the vertical position of the electron beam, while simultaneously assuring correct interlacing of the odd-field scanning and even-field scanning.

It should be noted that the beam spot diameter or the beam volume is changed with changes in brightness of video signals, with resulting changes in the absolute values of the beam-detection index signals IDA, IDB. According to the present invention, since these signals IDA, IDB are compared to each other for detecting the direction of the vertical beam deviation, the signal processing step of maintaining constant absolute values of the signals IDA, IDB may be dispensed with, thus additionally simplifying the circuit design.

Figure 6:
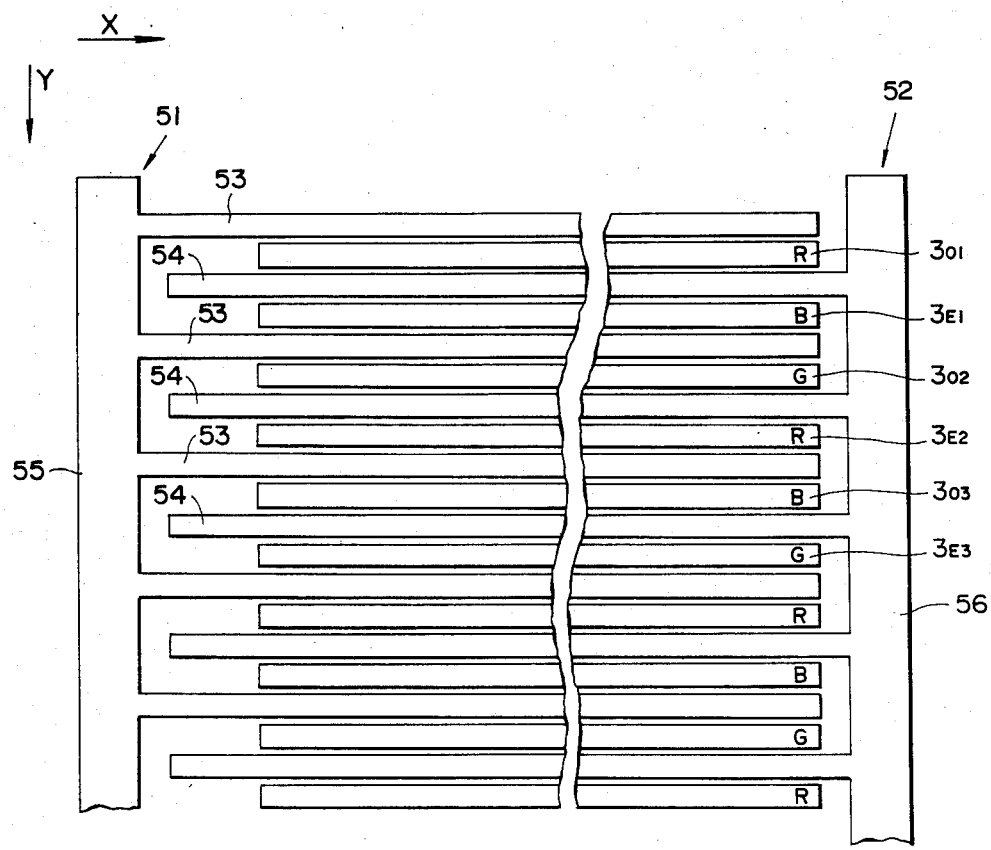
FIG. 6 is a plan view showing a portion of the inner surface of the CRT screen employed in a modified embodiment of the color television receiver according to the present invention.

FIG. 6 shows in plan view a portion of the fluorescent displaying surface of CRT as substantial part of a modified embodiment of the present invention.

In the embodiment shown in FIG. 6, color phosphorescent stripes or lines 3 and the guard bands are similar to those shown in FIGS. 1 and 2. Therefore, these parts are indicated by the same numerals as those used in FIGS. 1 and 2 and the corresponding description is omitted. On these guard bands, there are alternately arranged horizontal portions 53, 54 of two electrodes 51, 52 acting as two kinds of beam detection means and by means of which beam detection index signals can be taken out independently. These electrodes 51, 52 consist respectively of a vertical portion 55 formed with plural horizontal extensions 53 and another vertical portion 56 formed with plural horizontal portions 54 and are arranged as comb electrodes. Thus the comb electrodes 51, 52 are arranged on the guard bands with the horizontal extensions 53, 54 meshing with each other, that is, with the horizontal extensions 53 of the electrode 51 lying in interstices defined between horizontal extensions 54 of the other electrode 52.

With the use of the CRT provided with the above described fluorescent display surface and, for example, the circuit shown in FIG. 3, it is possible to effect beam landing control through compensation of vertical beam deviation. In the embodiment shown in FIG. 6, however, the light sensors 23A, 23B shown in FIG. 3 may be eliminated. It is only necessary that the comb electrodes 51, 52 be connected to leads and the above described beam detection index signals IDA, IDB be taken out independently and directly from these electrodes 51, 52.

The construction and operation as well as the effect of the present embodiment are otherwise similar to those shown in connection with FIGS. 1 to 5 and therefore the corresponding description is omitted.

It should be noted that the index phosphorescent stipes consisting of the above described index phosphorescent materials and the horizontal sections of the comb electrode may be provided alternately on the guard bands as the aforementioned two kinds of beam detection means, in such a manner that beam detection index signal may be taken out independently from these stripes and the comb electrodes.

From the foregoing it is seen that the present invention provides a television receiver in which beam landing control, that is, control of the vertical position of the electron beam spot, may be positively performed without the necessity of performing any processing of video signals and with an extremely simplified circuit consisting in simply comparing the independently taken out beam detection index signals. In addition, since the two kinds of beam detection means are alternately arranged on the guard bands arranged in turn between alternately arranged even-field and odd-field fluorescent lines, interlacing between these odd- and even-field lines can be easily realized by a simplified circuit by means of which the direction in which to compare the beam detection index signals taken out independently from the beam detection means or the direction in which to compensate for vertical deviation of the beam position may be switched in relation to even-field scanning or odd-field scanning.

The present invention provides a television receiver capable of displaying color images with the use of a single beam of electrons, reducing the color switching frequency by using horizontally arranged color phosphorescent lines, and positively performing beam landing control. Thus, the television receiver of the present invention is practically useful despite its simpler circuit configuration. The invention may be conveniently applied to small-sized portable color television receiver.

What is claimed is:

1. A television receiver characterized in that a plurality of image-displaying fluorescent lines are disposed on a display surface of a cathode ray tube so as to extend along a main-scanning direction of an electron beam, said lines are disposed in a side-by-side relationship in a sub-scanning direction normal to said main-scanning direction, first and second beam detection stripes are alternately arranged on guard band portions that are disposed parallel to and between adjacent ones of said fluorescent lines, said first and second beam detection stripes being so adapted that corresponding first and second beam detection signals can be respectively obtained from said stripes, and in that the position of the electron beam relative to said fluorescent lines is compensated on the basis of said first and second beam detection signals obtained respectively from said first and second beam detection stripes and in that said beam detection stripes are extended outwardly to a beam run-in area of a raster area of said display surface and include color identifying means extending in said sub-scanning direction added to said beam detection stripe portions disposed in said run-in area.

2. The television receiver as claimed in claim 1 characterized in that index stripes 5A, 5B formed by two distinct kinds of fluorescent materials which produce light of different color temperatures are used as said first and second beam detection stripes and in that light emitted from said first and second index stripes 5A, 5B is sensed by respective first and second light sensors 23A, 23B.

3. The television receiver as claimed in claim 1 characterized in that two comb electrodes 51, 52 are used as said first and second beam detection stripes and in that respective terminals of these comb electrodes 51, 52 are taken out of the cathode ray tube.

4. The television receiver as claimed in claim 1 characterized in that a difference between said first and second beam detection signals derived from said first and second beam detection stripes is produced by a difference circuit 35 and an output therefrom is used for controlling the position of said electron beam in said sub-scanning direction.

5. A television receiver of the beam index type comprising:

a cathode ray tube having a plurality of image-displaying color fluorescent lines arranged in groups and extending in a main-scanning direction and disposed with a predetermined pitch in side-by-side relationship in a sub-scanning direction, with each of said color fluorescent lines in each group emitting light of a different color relative to the other lines of that group when excited by an electron beam;

first and second beam detection stripes extending in the main-scanning direction and being alternately arranged between adjacent ones of said plurality of color fluorescent lines, said first and second beam detection stripes emitting light of different respective color temperatures upon being excited by said electron beam;

index phosphorescent stripes extending in the sub-scanning direction and located in predetermined numbers on one end of selected ones of said first and second beam detection stripes, said index phosphorescent stripes being formed of the same material as said first and second beam detection stripes on which they are located and being arranged in a mumber of different, predetermined patterns corresponding to the number of said color fluorescent lines in each said group, each of said patterns corresponding to a different color; and means for detecting light emitted from said first and second beam detection stripes upon excitation by said electron beam for controlling the position of said electron beam in said sub-scanning direction.

6. A television receiver according to claim 5, in which said color fluorescent lines comprise red, blue, and green stripes in each group and said index phosphorescent stripes are arranged so that three vertical stripes indicate a blue color and one vertical stripe indicates a green color.

7. A television receiver according to claim 5, in which said first and second beam detection stripes are arranged as comb electrodes and further including respective terminals for said comb electrodes for obtaining signals therefrom.

8. A television receiver according to claim 5, in which said number of different, predetermined patterns of said index phosphorescent stripes includes zero stripes, one stripe, and three stripes.

* * * * *